United States Patent [19]

Hunter et al.

[11] 4,288,346

[45] Sep. 8, 1981

[54] CATALYST FOR CATALYTIC HEAT EXCHANGE

[75] Inventors: James B. Hunter, Newtown Square; George McGuire, West Chester, both of Pa.

[73] Assignee: Johnson Matthey Inc., Malvern, Pa.

[21] Appl. No.: 119,315

[22] Filed: Feb. 7, 1980

Related U.S. Application Data

[63] Continuation of Ser. No. 925,862, Jul. 18, 1978, Pat. No. 4,214,867.

[51] Int. Cl.³ .................... B01J 21/04; B01J 23/64; B01J 27/18; B01J 35/04
[52] U.S. Cl. ........................... 252/437; 252/466 PT; 252/477 R; 427/247
[58] Field of Search ............ 252/437, 466 PT, 477 R; 427/247, 376.3, 376.4, 376.5; 428/256, 469

[56] References Cited

U.S. PATENT DOCUMENTS

| 2,676,899 | 4/1954 | Hackley | 427/376.4 |
| 2,866,692 | 12/1958 | Kautter et al. | 252/477 R |
| 3,362,783 | 1/1968 | Leak | 252/477 R |
| 3,437,605 | 4/1969 | Keith | 252/463 |
| 3,799,796 | 3/1974 | Hunter | 427/227 |
| 4,096,095 | 6/1978 | Cairns | 252/466 PT |

Primary Examiner—W. J. Shine
Attorney, Agent, or Firm—Cushman, Darby & Cushman

[57] ABSTRACT

A process for catalytic heat exchange which comprises providing a ceramic coated metal heat transfer membrane having two sides, one of which is catalytic, flowing a first gas over the catalytic side of the ceramic coated metal heat transfer membrane to generate heat, and flowing a second gas or vapor over the opposite side of the membrane whereby heat is transferred from the first gas to the second gas or vapor. Apparatus for carrying out the process is also disclosed.

4 Claims, 3 Drawing Figures

CATALYST FOR CATALYTIC HEAT EXCHANGE

This is a continuation of application Ser. No. 925,862, filed July 18, 1978, now U.S. Pat. No. 4,214,867.

The present invention relates to a novel high temperature catalytic heat exchange method and apparatus.

A wide variety of heat exchange systems involving the generation and/or transfer of heat have previously been proposed. However, the energy crisis and the resultant need for increased efficiency of energy production from gaseous and liquid fuels require more refined methods and apparatus for maximizing effective heat exchange.

Accordingly, the principal object of the present invention is to provide an improved method and apparatus for obtaining highly efficient heat exchange. A more specific object is to provide a method and means involving flameless combustion or other reaction with highly effective heat recovery. Other objects will also be hereinafter evident.

Broadly stated, the invention is based on the concept of flowing a gaseous reaction mixture over a catalytically active surface of a ceramic coated metal heat transfer membrane to effect an exothermic reaction while flowing another gas which needs to be heated over the other surface of the membrane so the other gas is heated by heat transfer. The gas to be heated may be used solely for the purpose of recovering heat from the gaseous reaction mixture before the latter is discharged into the atmosphere or it may itself comprise gaseous reactable components which require heat for reaction.

According to a more specific aspect of the invention, the ceramic coated metal heat transfer membrane (hereinafter referred to as "ceramic/metal membrane") includes on one of its surfaces a catalytic coating, e.g. a platinum group metal or mixture thereof, and a fuel (e.g. propane)/air mixture is passed over this catalyzed surface. Flameless combustion occurs in and on the catalyzed surface with the liberation of a considerable amount of heat which is rapidly transferred through the membrane to the opposite surface thereof. By flowing air or other gas to be heated over this surface of the membrane, either countercurrent, concurrent or cross current to the fuel/air mixture flowing on the other side, the air or other gas is heated in an exceptionally effective way.

Typically the catalytic heat exchanger of the invention comprises a plurality of ceramic coated metal membranes, e.g. screens woven of oxidation resistant metal, fixed in a closely spaced parallel arrangement so as to form alternating combustion or reaction zones and heating zones. The opposed surfaces of the screens which define the combustion or reaction zones are catalyzed with platinum or other catalytically active material so that as the reaction gas, e.g. a combustible fuel/air mixture flows through the combustion or reaction zone along the catalyzed surfaces thereof, flameless combustion or reaction occurs with the resultant liberation of a substantial amount of heat which, as noted, is transferred through the membranes to the gas flowing through the heating zones.

The invention makes possible the provision of highly efficient non-polluting flameless burner/heat exchanger units for household heating and for industrial gas utilization with air pollution control. Additionally, with some minor modifications, the system described herein may be applied to the construction of catalytic chemical reactors wherein the rapid addition or subtraction of heat is required. An example is the highly exothermic reaction of carbon monoxide and hydrogen to produce synthetic natural gas.

$$CO + 3H_2 \rightarrow CH_4 + H_2O + \text{Heat}$$

Other exothermic and endothermic reactions may also be substantially improved using heat exchange apparatus based on the invention.

The method and apparatus of the invention offer a number of advantages when used, for example, for flameless combustion of fuel/air mixtures to heat air. The following advantages may be mentioned:

(1) It is possible to obtain an improved heat exchange coefficient by elimination of a hot side gas film resistance leading to smaller sized heating units.

(2) Air pollutants such as carbon monoxide and unburned hydrocarbons are eliminated because of the improved conversion resulting from catalytic flameless burning. Nitrogen oxides are prevented from forming because of the lower catalytic burning temperatures compared to those associated with flame burning.

(3) For the same BTU exchange capacity, a catalytic burner with direct heat exchange is significantly smaller in size than the conventional flame burner/heat exchanger combination since a substantial portion of the total heat is transferred directly from the burning zone.

(4) On a more general basis, the catalytic heat exchanger can be made of lightweight construction involving relatively inexpensive materials resistant to high temperature oxidation. Additionally, the apparatus is characterized by dimensional stability and excellent high temperature heat transfer.

(5) The fuel values in low BTU gas are difficult to burn in a free flame. These can, however, be completely converted to useful heat energy by combustion on a catalytic surface.

(6) Air mixtures containing liquid hydrocarbons or other organics that can be vaporized or finely atomized can also be burned catalytically to recover the total heat content of this type of fuel.

The success of the invention is based on the use of the catalytically active ceramic/metal membranes as described herein. These membranes comprise a metal substrate coated with ceramic so as to be gas impervious and catalyzed as desired. The substrate may comprise totally or in part woven metal screen or mesh, expanded metal or corrugated metal strip or foil. Screen is preferred although other metal forms, including those indicated, may be used provided they can be fabricated so as not to buckle when heated and cooled. Knitted or nonwoven metal in relatively thin form may also be employed.

The metal selected from the substrate may be any metal (including alloys) which is capable of withstanding the temperature involved when coated with the ceramic. High temperature oxidation resistant alloys, e.g. the "Kanthal" and "Fecralloy" types, may be used although stainless steels which are not normally themselves resistant to high temperatures can also be effectively used due to the high temperature resistance of the ceramic coating.

A wide variety of structural ceramic coating compositions may be used for present purposes. The ceramic selected should provide a coating that is sufficiently heat conductive to permit the desired heat exchange while withstanding the temperature involved. Typically suitable ceramic coating compositions are refractory cements, e.g. those based on refractory oxides. Preferably, the ceramic coating is a high density alumina cement, e.g. an aqueous slurry of alumina or alumina/silica mixture such as the product available as "Fiberfrax QF-180 Cement" (Carborundum). This product comprises the reaction product of $Al_2O_3$ and $SiO_2$ blown into fibers and a small amount (e.g. 10–50% by weight) of an air-setting, temperature resistant binder, such as colloidal silica. The diameters and lengths of the fibers are preferably in the range of 1–10 microns. Other commercially available ceramic coating compositions which are suitable for use herein include the "Dylon" C-3, C-10 or C-7 products, these being high density silica, alumina or silica-alumina cements or "Alseal" 500 which comprises a dispersion of aluminum metal powder in an aqueous solution of chromium salt and a ceramic binder such as aluminum phosphate, the aluminum in "Alseal" apparently being converted to aluminum oxide on heating at elevated temperatures. The "Alseal" composition is described in Belgian Pat. No. 825180 and its use is disclosed in application Ser. No. 876,565, filed on Feb. 10, 1978 now U.S. Pat. No. 4,196,099, in the names of Hunter, McGuire, D'Allessandro and Lawlor and having a common assignee with the present case.

As noted, the metal screen or equivalent metal substrate should be coated with the structural ceramic composition so as to fill any openings therein and make the same impervious to the passage of gas therethrough. Thereafter, or simultaneously therewith, a high surface refractory oxide or like washcoat material, preferably but not necessarily an alumina ($\alpha Al_2O_3$) washcoat, is applied on one side of the ceramic coated metal followed by application of the catalytic coating, e.g. platinum group metal over the washcoat or like high surface refractory. In some cases, it is possible to use the washcoat without the initial structural ceramic coating or cement or vice versa but it is preferred to use both. Additionally, in some cases, the washcoat itself may be adequately catalytic to effect the desired result so that further catalyst need not be added. It is, however, generally preferred to platinize or otherwise catalyze the washcoated ceramic/metal membrane.

The invention contemplates flameless catalytic combustion or reaction on one side of the catalyzed ceramic/metal membrane. Accordingly, the rate of gas flow on each side of the membrane should be selected to maintain flameless operations. Rates of flow will necessarily vary depending in each case on the design of the unit, the nature of the gases involved and the results desired. Optimum flow rates can be readily determined by trial and error for specific gases and exchanger designs. Broadly the flow rates should be such as to maintain the desired flameless combustion as stated above. In particular, the air flow should not be either so fast as to quench the catalytic combustion or so slow that ignition of the fuel/air mixture results in flashback to the fuel source.

The catalytic heat exchanger of the invention may be made using a variety of different materials and many different designs. Structural ceramic cements, e.g. commercial products such as Dylon C-3, C-7 or C-10, Fiberfrax (QF-180) or the like, are applied to 18 mesh Kanthal screen to form ceramic/metal membranes capable of withstanding high operation temperatures without significant distortion or disintegration.

Appropriate spacers, of the desired width and thickness, are fastened to these ceramic/metal membranes in order to define the necessary fuel/air and gas zones. After coating, the ceramic/metal membranes are allowed to dry at room temperature and subsequently fired at a higher temperature (e.g. 1000°–1600° F. or above) to completely stabilize the ceramic structures.

Any conventional high surface refractory oxide or the like, typically a washcoat or slip of $\alpha$-$Al_2O_3$ or $\gamma$-$Al_2O_3$ in the range of 10–300 $m^2/gm$ is applied to the fuel side of the membrane. This is allowed to dry at room temperature after which the membrane is heated at 200° F. and then fired at 1000° F. The washcoated surface may be thereafter platinized or catalyzed in the conventional fashion. The heat exchanger is assembled by spacing the burning cells with an air or gas passage. These are mounted in a suitable casing with or without outer insulation to further reduce heat losses.

It will be recognized that the fabrication methods described above are only representative of the various modifications that may be made without departing from the invention. The disclosed methods as described, produce flexible catalytic membranes which can be easily assembled to form heat exchangers of nearly any desired size, shape or configuration.

BRIEF DESCRIPTION OF THE DRAWINGS

The invention is described more fully by reference to the accompanying drawings wherein.

Referring more specifically to the drawings, FIG. 1 shows two views (plan and elevation) of a single ceramic/metal cell as previously described consisting of a ceramic coated metal screen or plate (1) coated on one side with an alumina washcoat (2) and platinized (or otherwise catalyzed) (3) over the inner surface. The inner surface of the adjacent ceramic coated metal screen or plate (5) is also washcoated and catalyzed in the same way as (1).

The two ceramic/metal elements (1) and (5) are sealed at each end (6) and spaced a fixed distance apart.

A fuel/air mixture enters at the bottom of the cell at (11) and flows upward between ceramic/metal elements (1) and (5). Catalytic or flameless combustion takes place on the inner surfaces of (1) and (5) and the exhaust gases or products of combustion leave the top of the cell at (12).

Air or other gas or vapor is directed across the outer surfaces of (1) and (5) as shown by arrows (7), (8), (9) and (10). Heat liberated during the flameless combustion thereby passes directly through the walls of elements (1) and (5) and is transferred to the gases so that the temperature of the gas at (8) is greater than at (7) and the temperature at (10) is greater than at (9).

Although the drawings show the gas to be heated as moving in cross-flow relative to the fuel/air and products of combustion, this is not an essential feature of the invention. Thus, the cool gas flow may be countercurrent or concurrent with the hot gas flow or a combination of all of these modes may be used.

At the bottom of the cell on the elevation view is shown one or more strips of uncatalyzed metal screen (4). This screen acts to promote even distribution of the fuel/air mixture over the entire length of the cell and serves as a flashback arrester if this should occur in the burning zone.

Figure 1:
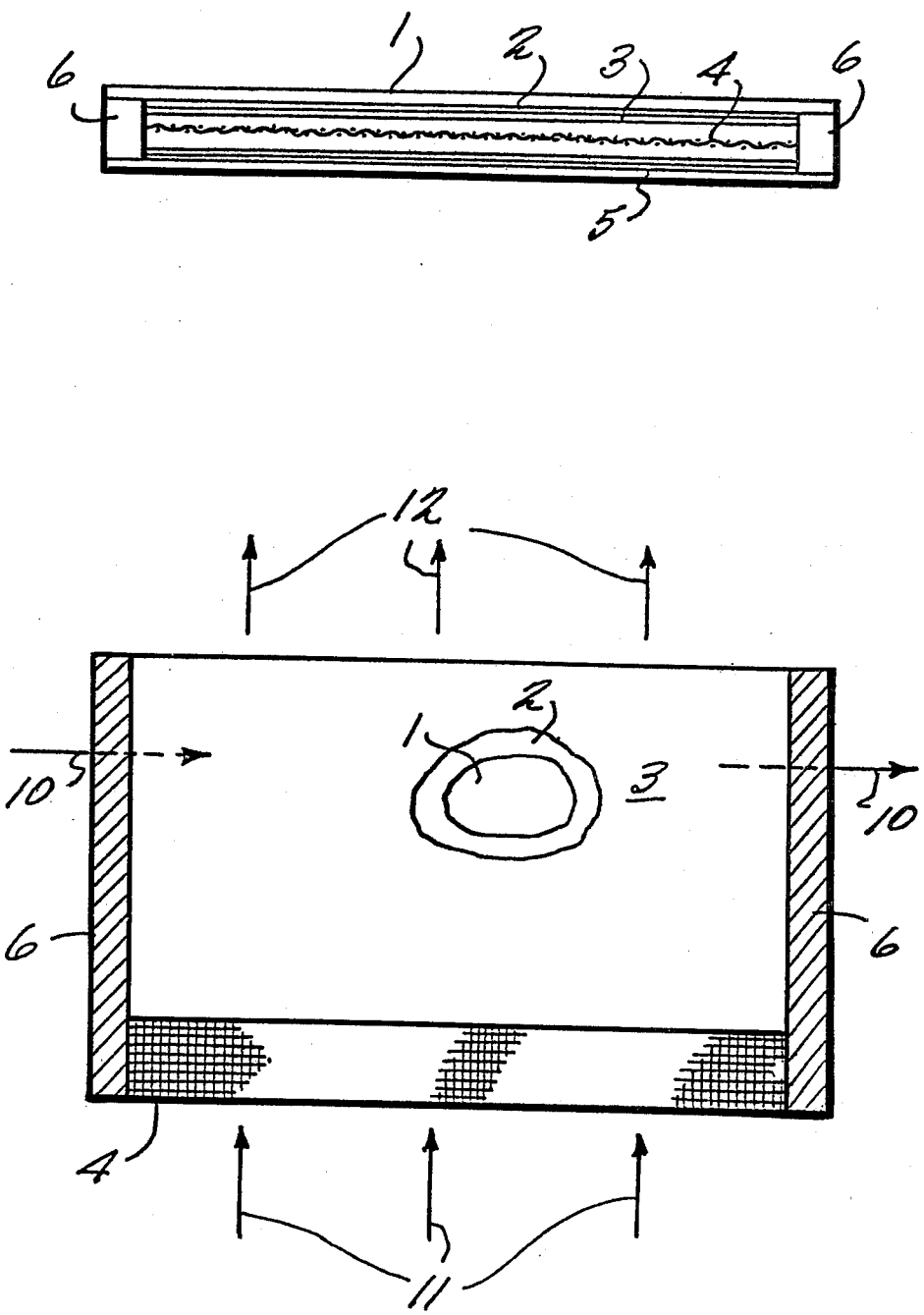
FIGS. 1, 2 and 3 illustrate the various features of the invention.

Only one element of the catalytic heat exchanger is shown in FIG. 1. However, it should be understood that additional heat release may be achieved by using further such elements in a parallel arrangement. The cool gas flow (7) and (8) then passes between the element as shown and an adjacent element not shown. In the same way, cool gas flow (9) and (10) pass between the other side of the element as shown and an adjacent element not shown.

The relative size of the cell elements and of the fuel-/gas/air flow all affect the temperature of the exit exhaust. In order to achieve the maximum heat transfer these parameters must be properly optimized.

The exact number of passes of air over the outside of the combustion element is not a feature of this invention. One or more passes may be used without altering the scope of this invention.

Figure 2:
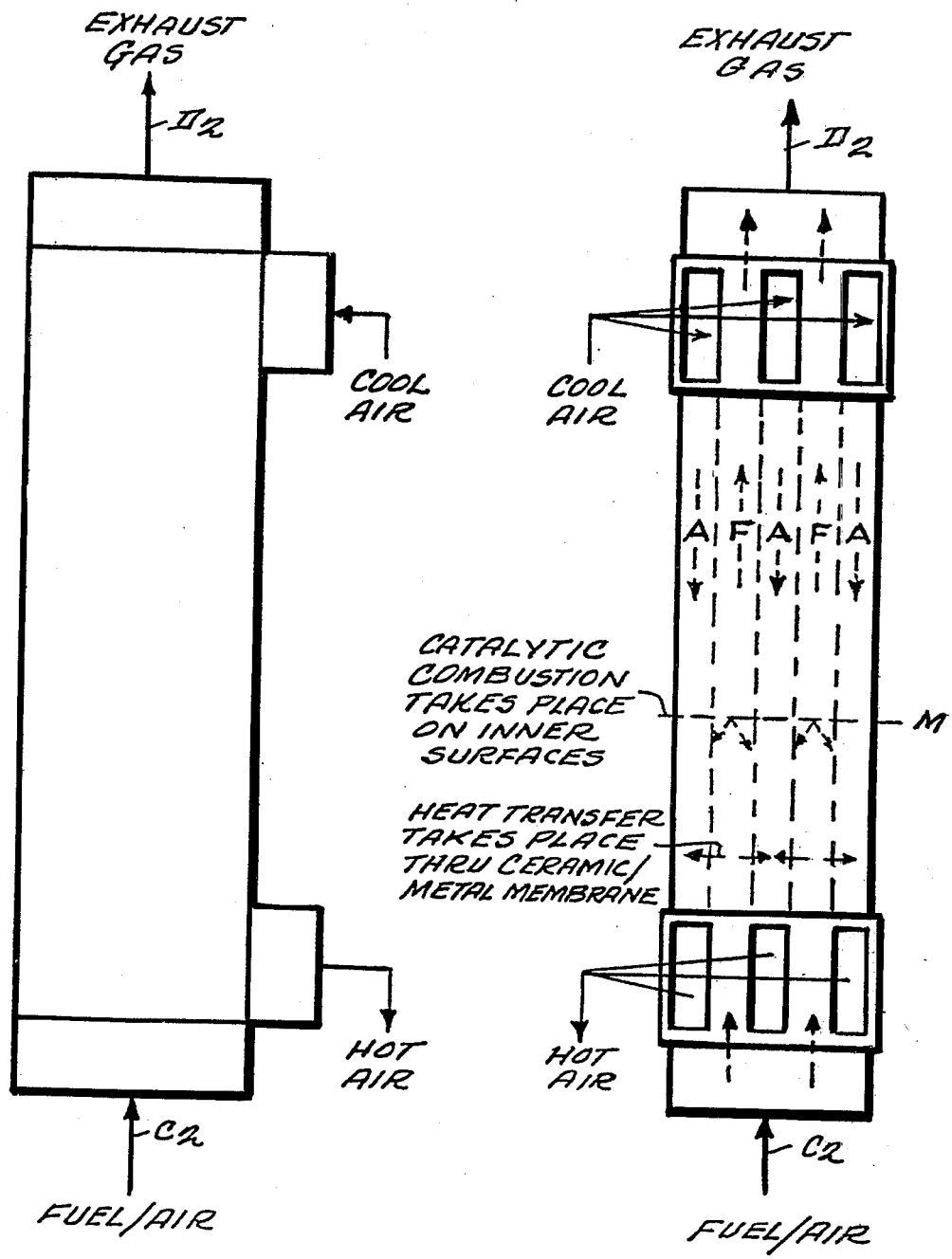

The invention is further illustrated in the following example using the reactor/heat exchanger shown in FIG. 2, and in conjunction with the system shown in FIG. 3.

EXAMPLE

A mixture of propane and air was admitted at the bottom of the reactor/heat exchanger through inlet $C_2$ and burned catalytically on the platinized walls of the ceramic membranes M in the combustion zones. The membranes themselves became very hot and glowed bright red for some distance up the reactor. Air to be heated was passed through zones countercurrent to the propane/air and left the exchanger at 793° F. The burned propane/air exhaust left the exchanger as shown at $D_2$ at 114° F. so that very little of the heat released was carried out the exhaust vent. Thus, almost all of the heat liberated by the reactor was recovered for useful purposes.

Figure 3:
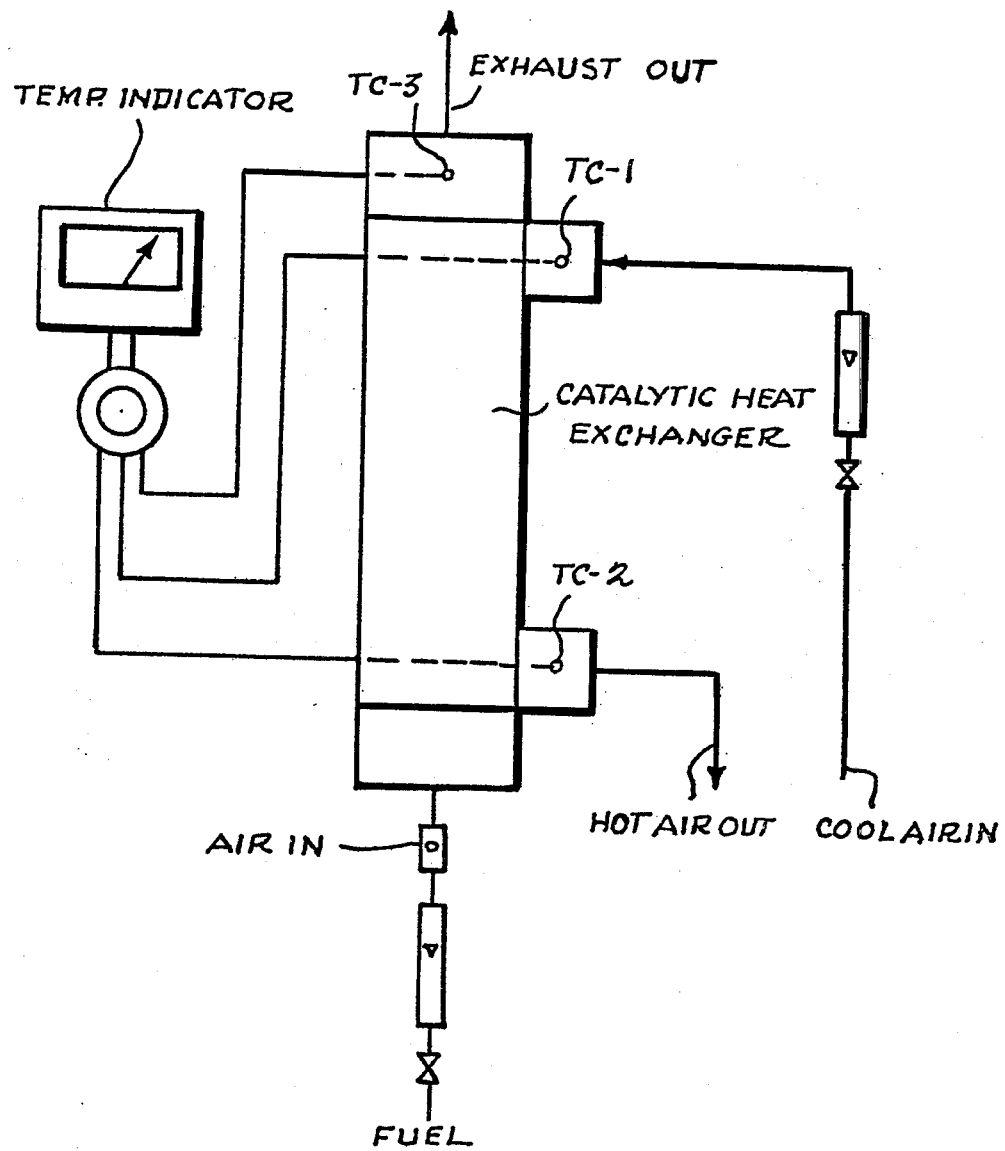

In carrying out the test, the maximum flow of propane which was possible with the test arrangement of FIG. 3 was employed together with an air flow (air to be heated) that was neither so high as to "quench" the catalytic burning by over-cooling nor so low as to allow the unit to overheat. This air flow was found by trial and error to be about 1.5 cubic feet/min. or 90 cubic feet/hr. for a propane flow of 0.0581 lbs/hr.

Gas temperatures were measured throughout the test of 332 minutes duration using thermocouples identified below as TC-1, TC-2 and TC-3 (FIG. 3). The temperatures recorded were as follows:

TABLE I

| Time (Mins.) | Gas Temperature | | |
|---|---|---|---|
| | TC-2 | TC-3 | TC-1 |
| 0 | 820 | | |
| 15 | 780 | | |
| 25 | 760 | | |
| 45 | 740 | | |
| 85 | 720 | | |
| 110 | 805 | | |
| 145 | 815 | | |
| 165 | 830 | 105 | 76 |
| 177 | 800 | 120 | 77 |
| 250 | 880 | 120 | 77 |
| 305 | 795 | 115 | 79 |
| 332 | 770 | 110 | 79 |
| Average | 793° | 114 | 78 |

The performance date for the test is summarized as follows:

TABLE II

| Propane Flow Rate at 78° F. | |
|---|---|
| Cubic Feet/Hour | 0.516[1] |
| Lb. Mols/Hour | 0.00132 |
| Lbs./Hour | 0.0581 |
| Air Flow Rate at 78° F. | |
| Cubic Feet/Hour | 90.0 |
| Average Equilibrium Temperatures | |
| Cool Air Inlet (TC-1) | 78° F. |
| Hot Air Outlet (TC-2) | 793 |
| Exhaust Gas Outlet (TC-3) | 114 |
| Heat Balance | |
| Heat from Combustion of Propane[2] | 1120 BTU/Hr. |
| Heat Out in Hot Air Stream | 1175 BTU/Hr. |
| Heat Out in Exhaust | 10 BTU/Hr. |

[1]Rotometer Reading = 90
[2]Assuming Heat of Combustion of Propane as 19292 BTU/Lb (2171 BTU/Ft³ at 77° F.)

It will be appreciated that various modifications may be made in the present heat exchanger and its use as illustrated above. Thus, while the exchanger is very efficient in producing and transferring BTU's from a combustion stream to a working gas stream to be heated, it can also be used as a catalytic reactor/heat exchanger for carrying out a wide variety of exothermic reactions requiring heat removal.

As an example there may be mentioned the methanation reaction wherein carbon monoxide (CO) and hydrogen ($H_2$) react to form methane ($CH_4$):

$$CO + 3H_2 \rightarrow CH_4 + H_2O + Heat$$

The large amount of heat that is liberated in this reaction is detrimental to the catalyst used and various unique designs and techniques have been proposed to deal with this problem. The U.S. Bureau of Mines, for example, has devised a reactor wherein catalytically active Raney nickel is sprayed on the outside of a bundle of tubes. A coolant such as Dowtherm is passed through the tubes. The $CO/H_2$ mixture passes around the outside of the tubes and the heat released by reaction on the Raney nickel passes through the tube wall to the Dowtherm and is removed from the reactor. The apparatus of the invention could be used to obtain the desired catalyst cooling effect by passing the $CO/H_2$ stream through alternate passages of the heat exchanger and passing cooling gas such as nitrogen through the others.

In a further modification, the invention may be used with a combination of exothermic and endothermic reactions. Thus, while the reaction between carbon monoxide (CO) and hydrogen ($H_2$) to form methane ($CH_4$) is a highly exothermic reaction, as noted above, the reaction between $CO + H_2O$ to form more $H_2$ and $CO_2$ (called "the shift" reaction):

$$CO + H_2O \rightarrow H_2 + CO_2$$

is an endothermic reaction requiring heat input. Accordingly, if the exothermic reaction is carried out in or on the walls of one set of membranes in the exchanger and the endothermic reactions are carried out in or on the opposite walls of the membranes, two separate reactions can be carried out simultaneously under conditions favorable to both. Other exothermic and endothermic reactions could also be conveniently handled in a reactor/heat exchanger of the present type.

Various other modifications may be made in the invention as described above. Hence, the scope of the invention is defined in the following claims wherein:

We claim:

1. A catalyst consisting essentially of a heat conductive metal screen membrane having two sides, the membrane being coated on both sides with alumina cement so as to fill openings in the screen and make the screen gas impervious, the alumina cement coating on at least one side having a catalytically active material thereon comprising one or more platinum group metals and the alumina cement coating being derived from an aqueous dispersion of aluminum metal powder, chromium salt and aluminum phosphate binder.

2. A catalyst according to claim 1 wherein the membrane is a woven screen.

3. A catalyst consisting essentially of a heat conductive metal screen membrane having two sides, the membrane being coated on both sides with alumina cement so as to fill openings in the screen and make the screen gas impervious, the alumina cement coating on at least one side having a catalytically active material thereon comprising one or more platinum group metals, said catalyst including a high surface area refractory coating on the alumina cement and carrying said catalytically active material.

4. A catalyst according to claim 3 wherein the cement comprises aluminum metal powder, chromium salt and aluminum phosphate binder.

* * * * *